US006882337B2

(12) United States Patent
Shetter

(10) Patent No.: US 6,882,337 B2
(45) Date of Patent: Apr. 19, 2005

(54) VIRTUAL KEYBOARD FOR TOUCH-TYPING USING AUDIO FEEDBACK

(75) Inventor: Martin Shetter, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 173 days.

(21) Appl. No.: 10/124,930

(22) Filed: Apr. 18, 2002

(65) Prior Publication Data

US 2003/0197687 A1 Oct. 23, 2003

(51) Int. Cl.[7] .................................................. G09G 5/00
(52) U.S. Cl. ........................ 345/173; 345/168; 345/773; 715/727; 715/728
(58) Field of Search ................................ 345/173–175, 345/172, 168, 169, 773, 429, 113; 715/727, 728; 382/230

(56) References Cited

U.S. PATENT DOCUMENTS

| | | | |
|---|---|---|---|
| 4,725,694 A | | 2/1988 | Auer et al. |
| 5,148,155 A | | 9/1992 | Martin et al. |
| 5,374,924 A | * | 12/1994 | McKiel, Jr. ............. 340/825.19 |
| 5,379,129 A | | 1/1995 | Othmer et al. |
| 5,801,692 A | | 9/1998 | Muzio et al. |
| 5,812,117 A | * | 9/1998 | Moon ......................... 345/169 |
| 5,963,671 A | * | 10/1999 | Comerford et al. ......... 382/230 |
| 6,121,960 A | * | 9/2000 | Carroll et al. .............. 345/173 |
| 6,184,876 B1 | * | 2/2001 | Miller ..................... 715/500.1 |
| 6,297,818 B1 | * | 10/2001 | Ulrich et al. ............ 715/500.1 |
| 6,384,743 B1 | * | 5/2002 | Vanderheiden ............... 341/21 |
| 6,424,338 B1 | * | 7/2002 | Anderson ................... 345/173 |
| 6,501,464 B1 | * | 12/2002 | Cobbley et al. ............ 345/173 |
| 6,532,005 B1 | * | 3/2003 | Campbell ................... 345/173 |
| 2002/0075316 A1 | * | 6/2002 | Dardick | 
| 2002/0085038 A1 | * | 7/2002 | Cobbley et al. |
| 2003/0001899 A1 | * | 1/2003 | Partanen et al. |
| 2003/0098858 A1 | * | 5/2003 | Perski et al. |
| 2003/0103066 A1 | * | 6/2003 | Sigl |

OTHER PUBLICATIONS

Algorithm for Decreasing the Error Rate of Data Entered on a Touch–Sensitive Terminal, IBM Technical Disclosure Bulletin, vol 33, No. 10A, Mar. 1, 1991, pp. 223–227.*

International Standard: ISO 9241–2:E "Ergonomic requirements for office work with visual display terminals (VDTs)—Part 4: Keyboard requirements".

* cited by examiner

Primary Examiner—Regina Liang
Assistant Examiner—Jennifer T. Nguyen
(74) Attorney, Agent, or Firm—Leydig, Voit & Mayer, LTD

(57) ABSTRACT

A virtual keyboard displayed on a touch sensitive screen allows a user to do touch-typing thereon to enter textual data into a computer. The keyboard image has a standard key layout for typewriting, and the keys are sized to allow the fingers of the user to take the positions necessary for "ten-finger" touch-typing in the standard fashion. The virtual keyboard image is semi-transparently displayed over on a background image, with the individual keys shown with shaded edges so that they can be easily distinguished from features in the background image. When a key is touched, a sound is generated. The sound generated when the touch is away from a target portion of the key is different from the sound generated when the touch is on or adjacent to the target portion of the key, thereby providing audio feedback to enable the user to adjust finger positions to maintain proper alignment with the virtual keys.

24 Claims, 9 Drawing Sheets

VIRTUAL KEYBOARD FOR TOUCH-TYPING USING AUDIO FEEDBACK

TECHNICAL FIELD

The present invention relates generally to input and output devices for a user to communicate with a computer system, and more particularly to touch sensitive displays used for both input and output.

BACKGROUND OF THE INVENTION

Physical keyboards are the most ubiquitous input devices for users to enter data and commands into computers. Typing is a widely known and commonly practiced skill. When digital computing became a reality, physical keyboards having the standard typewriter key layout (commonly known as the "QWERTY" key layout) naturally became the standard input means for a user to enter data into a computer. By typing on a keyboard, a user can enter a large amount of textual data into the computer quickly.

Touch sensitive displays have also been used for a long time for computer user interface purposes, and are widely used on customer service devices, such as automatic teller machines, where user input options are often limited and simple and the speed of data entry is not a concern. An important advantage of a touch sensitive display device is that the same device serves as both an output device for presenting user-viewable images and an input device for entering user selections. User selectable options are typically presented as graphic features, such as user-selectable buttons or icons, on the touch sensitive screen, and the user selects an option by touching the graphic feature associated with that option. The location of the touch is detected by the device and used to determine which option has been selected.

As the computer technology advances and our dependence on computing devices for daily functions increases, the portability of computing devices becomes an increasingly important issue. For example, Personal Digital Assistance (PDA) devices have become very popular largely due to their portability. In order to be compact and portable, such devices typically do not have a physical keyboard. Instead, they use a touch sensitive screen for both input and output. Typically, a user enters textual data by pressing the keys of a miniature keyboard image displayed on the touch sensitive screen with a small stylus. The problem with such a miniature "virtual" keyboard is that it is very inconvenient to use, as the user has to "hunt and peck" the keys one by one with the stylus, making data entry a very slow and tedious process.

The trend to make computing devices portable and versatile is evidenced by the recent development of a new generation of smart display devices that run the Windows CE operating system of the Microsoft Corporation. One of such new display devices is a tablet-like detachable monitor for a personal computer (PC). The monitor has a touch sensitive screen and, once detached from the computer, communicates wirelessly with the computer to work as a portable monitor. Using this portable touch-sensitive display device, a user can move around the office or house while using the computer to respond to e-mail messages, edit documents, browsing the World Wide Web, etc., without having to be tied to the location of the computer. Since portability is one of its main features, this portable monitor device does not require a physical keyboard and uses its touch screen for user input when it is detached from the computer.

One of the technical challenges in developing the portable monitor device is how to improve the user input functions to enable a user to easily and conveniently enter textual data into the computer. In contrast to PDAs that have limited processing power and serve limited functions, the portable monitor device is wirelessly connected to the computer, and the user is likely to use the device for extensive editing and composing operations in the same way the user would when sitting in front the computer. The conventional "virtual keyboards" found on PDAs or the like are not satisfactory for input purposes because they do not feel or look like a regular physical keyboard and are not operated like a physical keyboard. What is needed is a virtual keyboard that can be used by a user like a regular physical keyboard to enter textual data conveniently and quickly. In other words, what is needed is a virtual keyboard that a user can use for "ten-finger" touch-typing as if it were a regular keyboard. It will be appreciated that a touch-typable virtual keyboard is not only useful for the aforementioned portable monitor device but can be advantageously used on many different touch-screen applications.

SUMMARY OF THE INVENTION

In view of the foregoing, the present invention provides a virtual keyboard displayed on a touch sensitive screen that enables a user to do touch-typing thereon to enter textual data into a computer. The virtual keyboard has a combination of features that facilitates "ten-finger" touch-typing as if using a regular physical keyboard. Specifically, to enable a user to type directly on the touch sensitive screen, the keyboard image has the standard key layout of physical keyboards or typewriters. The keys of the virtual keyboard are arranged and sized to allow the ten fingers of the user to take the positions necessary for typing in the standard fashion. The keyboard image is made semi-transparent and superimposed or "alpha-blended" with a background image (such as a user interface window of an application running on the computer) so that the keyboard image and the background image may be displayed and viewed simultaneously. This allows the user to view interface images created by an application while entering textual data by touch-typing on the virtual keyboard. To enhance the visibility of the semi-transparent keyboard image over the background image, the individual keys of the virtual keyboard are displayed with shaded edges to mimic the three-dimensional look of real keys on a physical keyboard. Moreover, a sound is generated each time a touch on a key of the virtual keyboard is detected to indicate that a keystroke has been made.

In according with another aspect and a feature of the invention, audio feedback is provided for indicating whether the user's fingers are properly striking the keys in the virtual keyboard, thereby enabling the user to tell whether her fingers are properly aligned with the keys. To that end, each key has a target portion corresponding to the key region that is typically struck while typing upon the virtual keyboard. A first type of sound is generated when the user's finger contacts the target portion of a key of the virtual keyboard. If the user's finger touches the key at a point away from the target portion of the key, a sound of a second type different from the first one is generated to indicate that the keystroke is off-target. By listening to the sounds generated while touch-typing on the virtual keyboard, the user can tell whether her hands are drifting to one side, and make adjustments accordingly. Thus, the audio feedback provides a mechanism for the user to maintain proper alignment of her fingers with respect to the keys of the virtual keyboard during rapid typing without having to constantly look down to see whether her fingers are touching the keys at the right places.

DETAIL DESCRIPTION OF THE INVENTION

Figure 1:
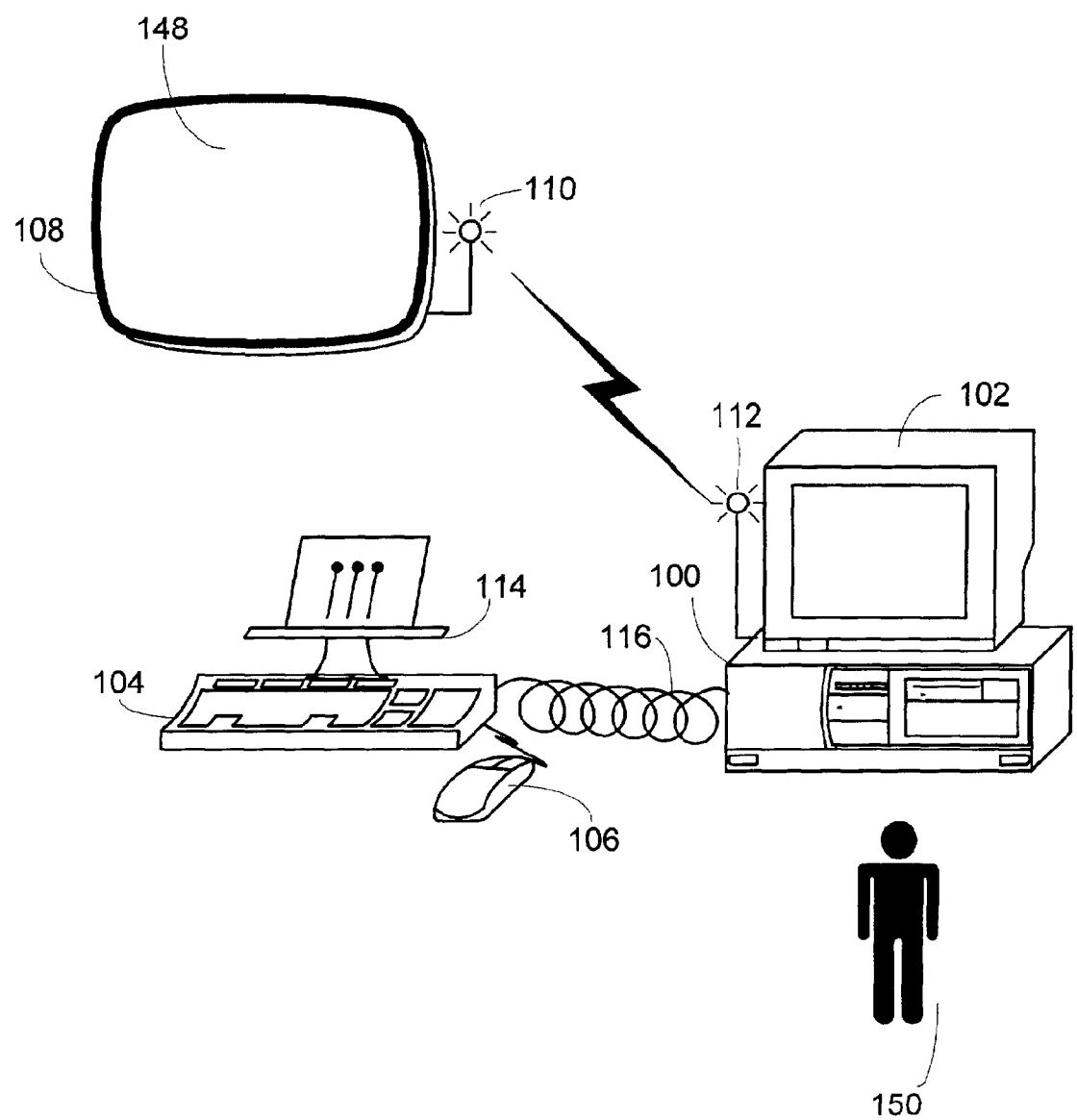
FIG. 1 is a schematic diagram of an embodiment of the invention having a portable touch-sensitive monitor that provides a virtual keyboard for touch-typing.

Referring now to the drawings, wherein like reference numerals refer to like elements, FIG. 1 shows a preferred embodiment of a computer system that implements a virtual keyboard for touch-typing according to the invention. The computer system 100 includes a housing containing the central processing unit and has a plurality of input and output devices for use by a user to communicate with the computer. As shown in FIG. 1, the input and output devices include a conventional monitor 102 (optional), a keyboard 104, a mouse 106, and a portable monitor 108 shown in wireless communication with the computer 100. The portable monitor 108 is of the type disclosed in U.S. patent application Ser. No. 09/784,716 entitled "Methods and Systems for a Portable, Interactive Display Device for use with a Computer," which is herein incorporated by reference in its entirety. The portable monitor 108 has a touch sensitive screen 148 and is shown in FIG. 1 to be in wireless communication with the computer 100. The wireless communications between the portable monitor 108 and the computer 100 preferably occur through a radio frequency channel by means of an antenna 110 on the portable monitor 108 and an antenna 112 on the computer 100. The portable monitor 108 can also be seated on a docking station 114 from which it can communicate with the computer system 100 over a communication cable 116.

Figure 2:
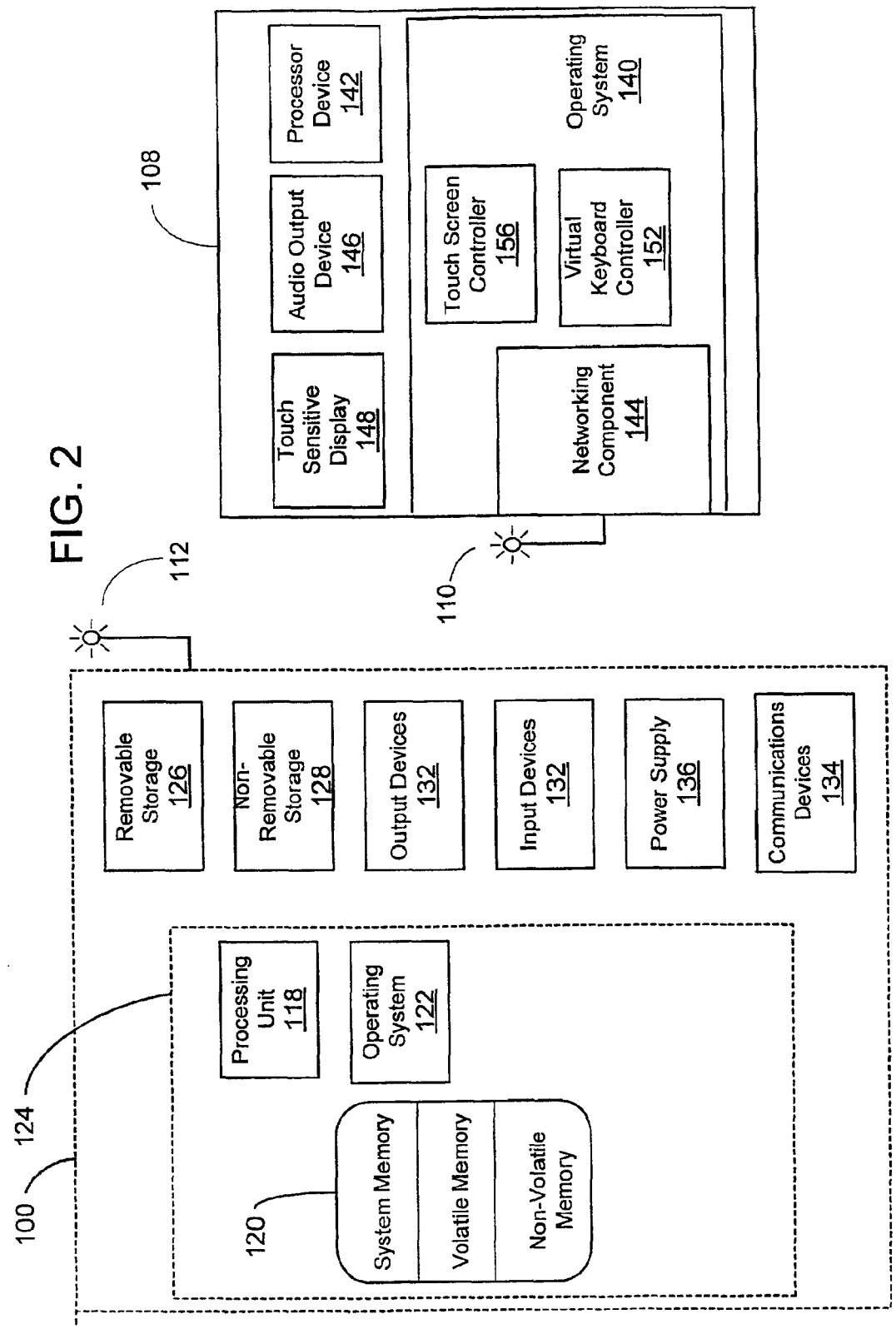
FIG. 2 is a schematic functional block diagram of the touch sensitive monitor and computer system of FIG. 1.

FIG. 2 shows an exemplary architecture for the computer system 100 and the portable monitor 108. In its most basic configuration, the computer system 100 typically includes at least one processing unit 118, memory 120 and an operating system 122. The memory 120 may by volatile, such as RAM, or non-volatile, such as ROM, or some combination of the two. The operating system 122 in part coordinates the activities of the processing unit, memory and other components that may be included with the computer system. For illustrative purposes, this basic configuration is outlined in FIG. 2 by dashed line 124.

The computer system may include additional features, some of which are shown in FIG. 2. For example, the computer system may include additional storage such as, but not limited to, magnetic disks, magnetic tape, optical disks and any other storage methods. The additional storage may be removable 126 from the computer system or non-removable 128. The computer system may also include any or all of a number of possible input devices 130 and output devices 132. Examples of such input devices include, but are not limited to, the physical keyboard 104, the computer mouse 106 and the touch sensitive display device 108. Output devices may include, for example, the monitor 102, audio devices, printers and also the touch sensitive display device 108. Additionally, the computer system may include communications devices 134 that allow the computer system to communicate with other devices. By way of example, communication devices may communicate over wires, such as over a direct-wired connection or a wired network, or they may communicate wirelessly, as through radio frequency or infrared transmissions, or other wireless technologies. Furthermore, the computer system may include a backup power supply 136 that can power the computer system when not connected to an outside power source.

Also illustrated in FIG. 2 is a block diagram depicting the exemplary components and functionalities included in the portable monitor 108. The portable monitor has its own processor 142 and an operating system 140 for managing and supporting the various hardware and software components located on the portable device. Also provided in the portable monitor 108 for communicating with the computer system 100 is a networking component 144 that, as illustrated, operates the antenna 110 for transmitting and receiving wireless communications to and from antenna 112 located on the computer. The portable monitor 108 has an audio output device 146 for generating various sounds.

Referring back to FIG. 1, the primary input and output hardware component of the portable monitor 108 is its touch sensitive screen 148. Various types of touch sensitive screens are widely available and commonly known in the art, and may be used in the portable monitor 108. The touch sensitive screen 148 provides the user interface for a user 150 to communicate with the computer system by displaying user-touchable images, receiving touches made by the user on the screen, and interpreting the touches based on their locations on the known layout of the displayed image. Touch sensitive screens typically include a display component and a touch sensor. Preferably, the display components used with the illustrated embodiment is a liquid crystal display, but other suitable display devices, such as cathode ray tubes, may be used for displaying the virtual keyboard of the invention. Possible touch sensor technologies and devices include, but again are not limited to, capacitive touch screens, resistive touch screens, surface acoustic wave touch screens, and other technologies known in the art. Referring to FIG. 2. a touch screen controller 156, which may be included as but is not required to be a part of the operating system 140, controls the detection of touches and the determination of the locations of the touches on the display screen 148. The display and operation of the virtual keyboard is controlled by a virtual keyboard controller 152, which may also be a part of the operating system 140.

Figure 3:
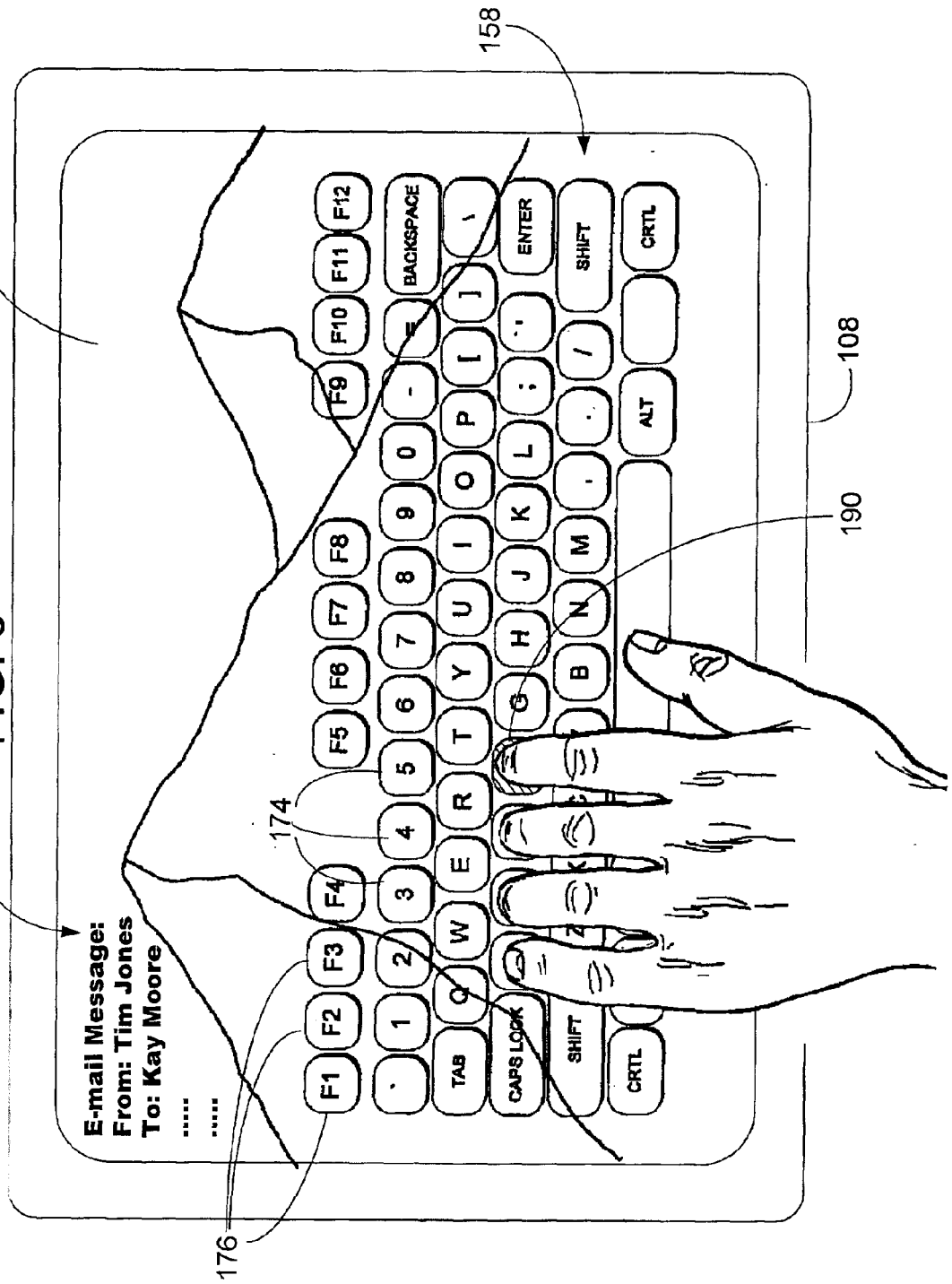
FIG. 3 illustrates a semi-transparent image of a virtual keyboard displayed over a background image on a touch sensitive screen.

Turning now to FIG. 3, the present invention provides a virtual keyboard that is configured to enable the user 150 to perform touch-typing directly on a touch sensitive screen, such as the screen 148 of the portable monitor 108. As used herein, the term "virtual keyboard" means the combination of an image of a keyboard having multiple keys displayed on a touch-sensitive screen, and the associated hardware and software components for detecting and interpreting touches on the individual keys.

In accordance with an aspect of the invention, the virtual keyboard in a preferred embodiment has a combination of features designed to enable a user to directly touch-type on the keys of the keyboard image as if typing on a physical keyboard. Specifically, to enable a user to type directly on the touch sensitive screen like typing on a physical keyboard, the keyboard image has the standard key layout of physical keyboards or typewriters, and the keys are sized sufficiently to allow the fingers of the user's hands to take the positions necessary for typing in the standard fashion. The keyboard image is made semi-transparent and superimposed or "blended" with a background image (such as an interface window of an application that the user is running) so that the keyboard image and the background image may be displayed and viewed simultaneously. This blending or superimposition of images provides efficient use of the limited viewable area of the touch sensitive display, a significant portion of which may be covered by the virtual keyboard. It allows the user to view interface images created by the application while entering textual data by touch-typing on the virtual keyboard. To make it easier for the user to distinguish the semi-transparent keyboard image from the background image, the images of the individual keys are displayed with rounded corners and shaded edges to mimic the three-dimensional look of real keys on a physical keyboard. Moreover, a sound is generated each time a touch on a key of the virtual keyboard is detected to indicate that a keystroke has been made. Each of these features is described in greater detail below.

First, the keyboard image of the virtual keyboard has the standard key layout found on physical keyboards, which of course may vary depending on the particular language for which the keyboards are designed. The keyboard image 158 illustrated in FIG. 3 is for the English language and has the standard QWERTY key layout for the letters in the English alphabet. Users familiar with and skilled in typing on physical keyboards of the standard key layout can readily recognize the displayed image and will be capable of typing on the keyboard image just as they would a physical keyboard. Depending upon the available space on the touch sensitive screen for the virtual keyboard image, the keyboard may optionally including keys representing numbers and general and/or special function commands.

For example, the keyboard image 158 on the touch sensitive screen 148 in FIG. 3 includes number keys 174 and function keys 176. For accommodating a shorter touch sensitive screen, however, the row of functions keys may be eliminated while the number keys are retained. Nevertheless, regardless of which keys are included, the keyboard should have at least the keys for the letters in the alphabet in the standard keyboard layout to allow the user to perform touch-typing.

To enable the user to comfortably type on the virtual keyboard with both hands, the keyboard image is sized to be sufficiently large to accommodate the hands and fingers of an average adult user as positioned for typing upon the keyboard image 158, as illustrated in FIG. 3 (only one hand shown). Preferably, the size and dimensions of the keyboard image approximate those of a physical keyboard. The alphanumeric portion of the keyboard image is sized to allow for the common typing position of placing four fingers on each hand simultaneously over four horizontally adjacent keys and placing the thumbs on the space bar. This allows the user to type on the virtual keyboard with all ten fingers like using a regular physical keyboard. This may be realized by placing the center points of the adjacent keys between approximately 16 mm to 22 mm apart.

The preferred keyboard sizing and layout may be accomplished by designing the keyboard image in accordance with ISO specification 9241, Part 4 entitled "Ergonomic Requirements for Office Work with Visual Display Terminals, Part 4: Keyboard Requirements," which is herein incorporated by reference. Accordingly, the preferred area per key should be at least 110 $mm^2$ with a width of approximately between 12 mm and 15 mm. More preferably, the key area should be on the order of 360 $mm^2$ with a width of about 19 mm. The horizontal and vertical distance between adjacent keys should preferably be approximately 19 mm from centerline to centerline. Other dimensions stated in the ISO specification may also be useful in determining the layout of the keyboard image.

In accordance with a feature of a preferred embodiment, the keyboard image of the virtual keyboard is a semi-transparent image superimposed on or blended with a second image that is hereinafter referred to as the background image. The keyboard and background images are blended together in a manner such that each image is distinctively recognizable. The background image may be a user interface window of an application that the user is running on the computer 100. For example, the application may be a spreadsheet application, with the interface window representing a spreadsheet. As another example, the application may be an email program, with the interface window showing an e-mail message received by the user. The user can view the e-mail message displayed on the screen 148 and then use the virtual keyboard to compose a response.

An important benefit of blending the background and keyboard images together is that the virtual keyboard can be displayed on the touch sensitive screen without having to reduce the portion of the screen used to display the background image. The virtual keyboard image, because it is sized sufficiently large to be suitable for "ten-finger" touch-typing, will cover a significantly large portion of the touch sensitive screen. Without the image blending or superimposition, the remaining portion of the screen can be too small to properly show the background image. To fit the background image in the part of the screen not covered by the keyboard image, either the background image has to be significantly reduced in size or only a small portion of it can be seen at a time, making it very inconvenient and/or difficult for the user to view the background image. Showing the virtual keyboard as a semi-transparent image superimposed on the background image effectively solves this problem and maximizes the efficient use of the display area of the touch sensitive screen.

FIG. 3 illustrates an example of a keyboard image 158 blended with a background image 154 for simultaneous display on the touch sensitive screen 148. The blending or combination of the background and keyboard images can be achieved by the graphic technique of alpha blending. Alpha blending, which is well known in art, is a pixel-by-pixel blending or merger of the color data for two distinct images. The color data of each pixel may be represented by a 32-bit value, with the red, green, blue, and alpha (or transparency) components of the color each represented by 8 bits, which can represent the numbers 0 through 255. The alpha value determines the extent to which keyboard color value is blended with the background color value. The blending of colors for the keyboard image with colors of the background image occurs according to the following formula:

combined color=keyboard color*alpha/255+background color*(255−alpha)/255

Setting the 8-bit alpha value for the keyboard image to any number less then 255 (i.e., 100%) results in merging the color data for the keyboard image 158 with the color data for the background image 154. Hence, when displayed on the touch sensitive display, the keyboard appears as a semi-transparent image superimposed over the background image. In a preferred embodiment, the keyboard image is set to be about 50% or more transparent to allow the background image to be seen easily.

To further assist the user in distinguishing the keyboard image from the underlying background image so that the two blended images do not appear as a visual jumble, the outlines of the images of the individual keys of the virtual keyboard appear with rounded corners. For example, referring to FIG. 5, the image 200 of a key is smoothly rounded instead of having sharp corners. Furthermore, the edges of the key outlines are shaded instead of being composed of straight thin lines. Rounding the corners and shading the edges give the keys of the virtual keyboard the three-dimensional look of real keys on a physical keyboard. Moreover, by eliminating the sharp, right angled corners and thin straight lines, the outlines of the keys are less likely to conflict with straight lines or text included in the background image. For instance, a user would be able to easily distinguish the rounded and shaded keys from the grids of a spreadsheet displayed as the background image. There are many different ways to create the 3-D like keyboard image. In one implementation, the image of the keyboard 154 is a digitalized picture of a physical keyboard that is scanned in and modified with a graphics program to remove keys that are not needed so that the resultant keyboard image can fit in the touch sensitive screen 148.

Since the touch sensitive screen is typically a flat surface, the key images cannot be pressed down like the keys on a physical keyboard. Thus, there is no vertical movement of a key that the user could rely on to tell whether the key has been actuated. This problem is solved by using audio feedback. Specifically, a sound is produced when a touch on any key of the virtual keyboard is detected. This sound indicates to the user that a virtual key has been actuated. In the simplest form, the sound generated for indicating key actuation may be a single pre-selected tone. In accordance with an aspect of the invention described in greater detail below, however, the sound may be altered based on which part of the key is touched to provide audio feedback that indicates to the user not only that a key is hit but also where her finger has hit the key.

In a preferred embodiment, for identifying the particular key that has been touched, the image of that key is changed during the contact while images of the adjacent keys remain unaltered. This is demonstrated in FIG. 3, where the image of the key 190 is altered (illustrated by hashing) to signify that it has been actuated. The alteration of the key image may be in the form of, for example, darkening or lightening the key image, or changing the color of the key image.

Figure 4:
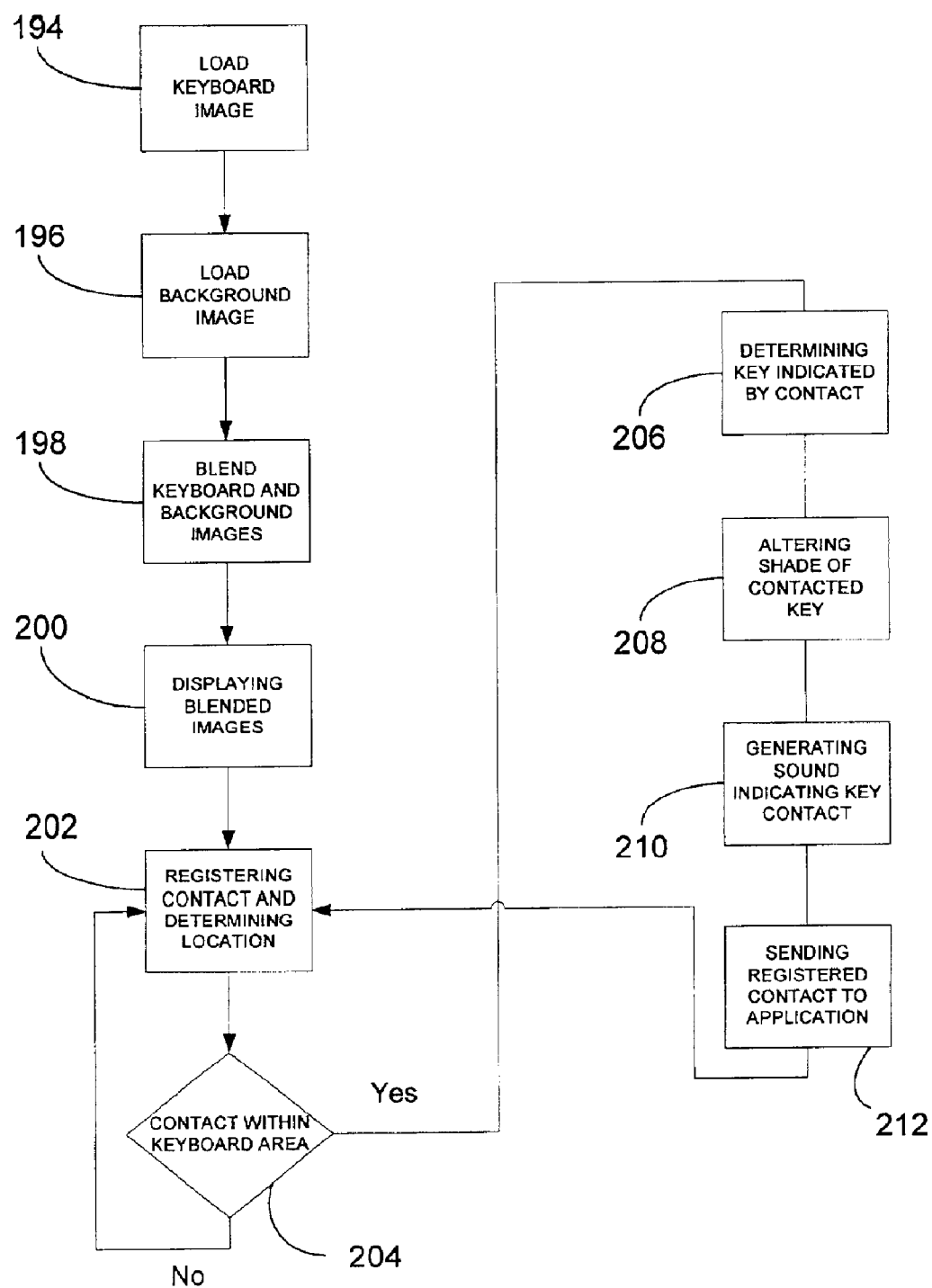
FIG. 4 is flow chart for the operation of the virtual keyboard of FIG. 3.

FIG. 4 is a flow chart that illustrates the operation of the virtual keyboard of FIG. 3. First, the image data of the virtual keyboard is fetched from the memory (step 194). A background image, which may be generated by an application or the operating system, is also provided (step 196). The two images are then combined, or blended, based on the transparency value of the keyboard image (step 198), and the combined image is displayed on the touch sensitive screen (step 200). During the typing process, a contact of the touch sensitive screen is registered, and the location of the contact is determined (step 202). The location is then analyzed to determine whether the contact location corresponds to one of the keys of the virtual keyboard, i.e., whether the contact location falls within one of the key images (step 204). If so, the particular key indicated by the contact is determined (step 206). A sound is generated to indicate that a keystroke has been received (step 208). Also, to indicate that a particular key has been selected, the image of that key is altered (step 210). A signal is also sent to the application the user is running to indicate the key that has been actuated (step 212).

Figure 5:
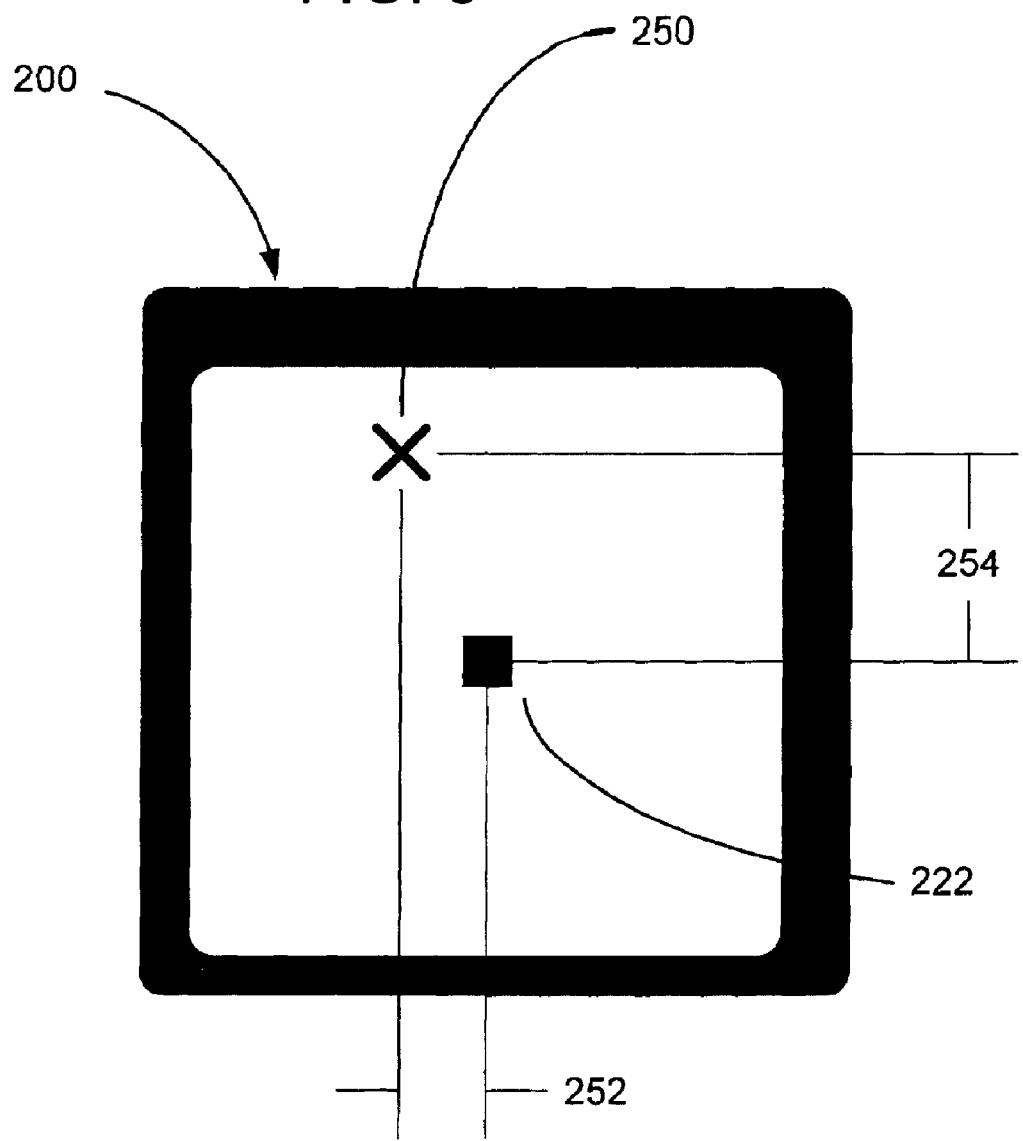
FIG. 5 is a schematic illustration of an image of a key of the virtual keyboard.

As mentioned above, in accordance with an aspect of the invention, the virtual keyboard provides audio feedback in the form of different sounds according to the contact location to indicate whether the user's fingers are properly aligned with the keys of the virtual keyboard. As illustrated in FIG. 5, the image of each key 200 in the virtual keyboard has a target portion 222 at a known location of the touch sensitive screen. In one embodiment as shown in FIG. 5, the target portion of the key may be set to be around the geographic center of the key image. When the user touches the key, the location of the contact point 250 is determined. A sound is then generated based on where the contact is within the key image. If the location of the contact point is at or adjacent to the target portion 222 of the key, a sound of a first type is generated. If, however, the contact location is away from the target portion, a different type of sound is generated to indicate to the user the she has missed the target portion of the key.

Figure 6:
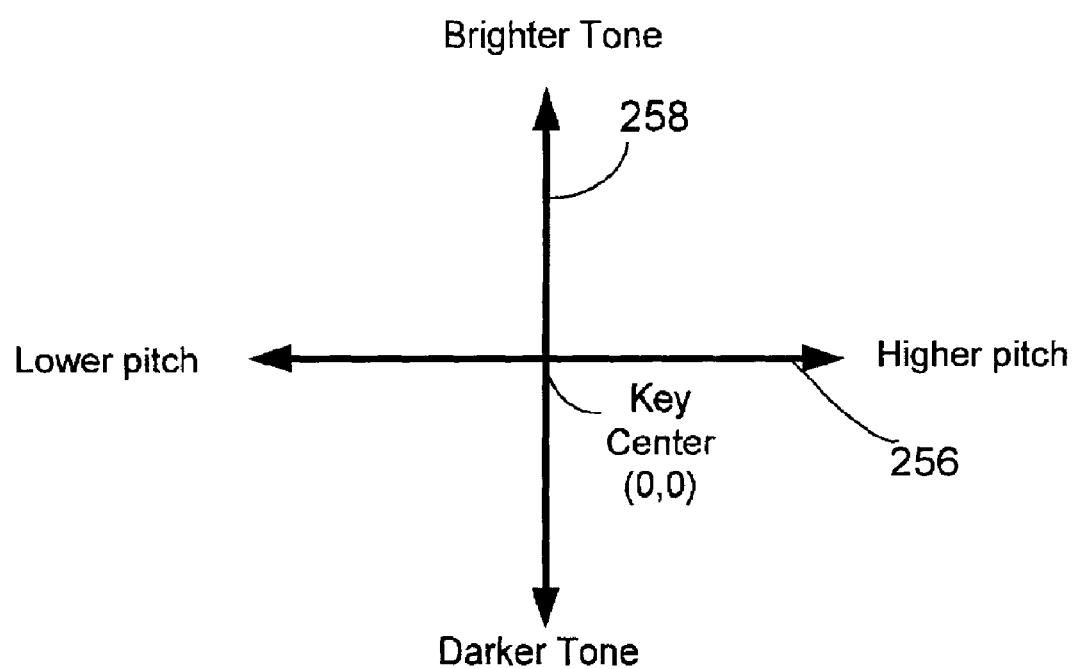
FIG. 6 is a diagram showing how in an embodiment of the invention the attributes of a sound generated in response to the touching of a key of the virtual keyboard varies with the location at which the key is touched.

The attributes of the sound generated to indicate an off-target keystroke may vary as a function of the contact location in different ways. For example, the sound may change as a function of the distance between the contact point 250 of the keystroke and the target portion 222 of the key. In one embodiment, the sound depends on both the direction and magnitude of the separation between the contact location and the target portion of the key. As shown in FIG. 5, the contact point 250 is offset from the target portion 222 by a displacement 252 in the left-right direction and a displacement 254 in the up-down direction. In one implementation as illustrated in FIG. 6, a displacement in the left-right direction 256 causes the pitch of the sound to increase or decrease, while a displacement in the up-down direction 258 causes the tone of the sound to become darker or brighter. Instead of the tone and pitch, other types of sound attributes (e.g., intensity) may be varied as a function of the offset from the target portion of the key.

In this way, the sound indicates not only that the keystroke is off-target but also the direction and distance of the offset from the target portion of the key. Thus, when the user is typing rapidly on the virtual keyboard, she can tell from the sounds generated in response to the keystrokes whether her fingers are drifting to one direction or the other, and make adjustments accordingly to regain proper alignment, without having to constantly look down at the key images to find out where her hands are. This allows the user to focus on the background image, in the case the background image is an interface window of the application the user is running, to see whether the input data she types in are correct and how the application responds to the input data.

Figure 7:
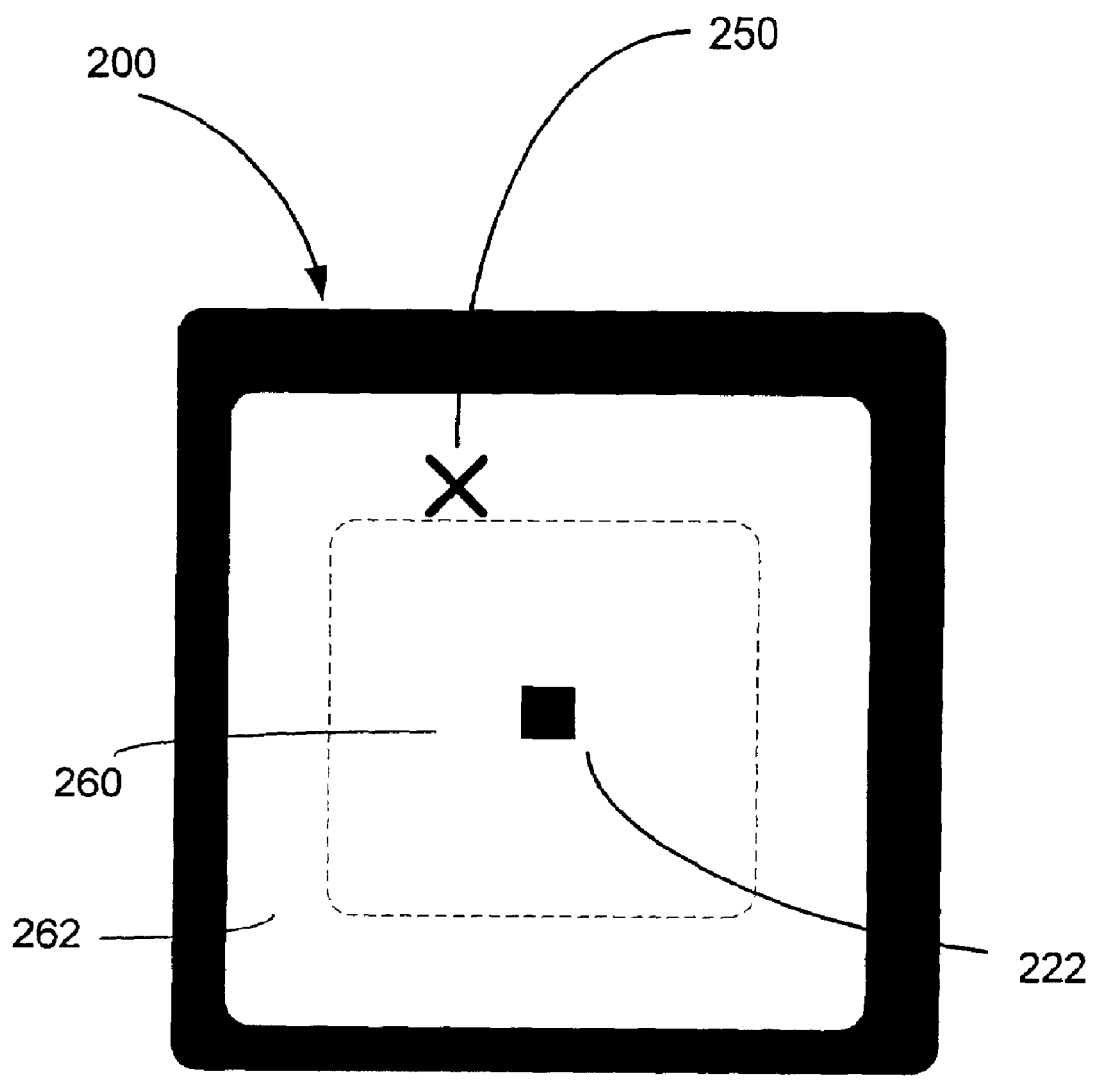
FIG. 7 is a schematic illustration of an image of a key of the virtual keyboard of an alternative embodiment that has different zones corresponding to different sounds to be generated for audio feedback when the key is touched.

As another example of how the audio feedback sound may depend on the location of the contact point of a keystroke, in one implementation illustrated in FIG. 7, each key image 200 is divided into a center zone 260 and an outer zone 262. A touch within the center zone 260 will cause a sound of a first pre-selected tone to be generated. If, however, the contact point 250 of the touch is in the outer zone 262, a sound of a second pre-selected tone is generated.

Figure 8:
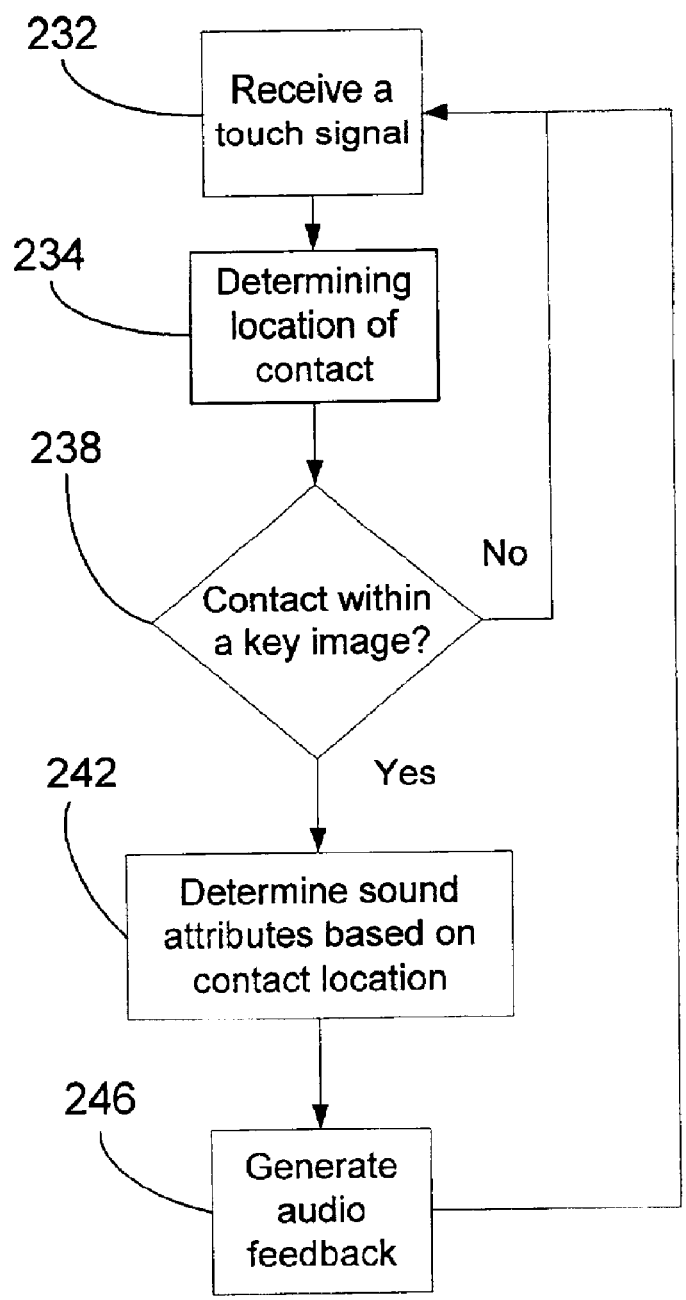
FIG. 8 is a flow chart showing a process of generating a sound for audio feedback when a key of the virtual keyboard is touched.

The flowchart illustrated in FIG. 8 represents the steps taken to generate audio feedback when the user types on the virtual keyboard image 158. When the user presses a key of the virtual keyboard, the touch screen controller 156 receives a touch signal from the touch sensitive screen (step 232). The touch screen controller 156 determines the location of the contact (step 234) and passes the location to the virtual keyboard controller 152. The virtual keyboard controller 152 then determines whether the touch is within the boundary of the image of any key of the virtual keyboard (step 238). If so, the virtual keyboard controller determines what kind of sound should be generated according to the relative position of the contact location to the target portion of the key (step 242). The virtual keyboard controller then causes the audio output 146 to generate the sound (step 246), thereby providing audio feedback to the user.

For customizing the audio feedback to accommodate the various typing styles of individual users, in some embodiments it may be preferable to set the target portion of a given key image to be different than the geometric center of the key. For example, a user may consistently strike the lowest row of keys on the virtual keyboard closer towards the key tops while still acceptably typing upon the virtual keyboard. To generate the sound indicating the "correct" keystroke consistent with the user's particular typing style, the target portion should be adjusted upwards from the center points of the lowest row of keys. The displacement between the location of the key strike and the location of the target position is then used to alter the generated sound. Customizing the virtual keyboard can be accomplished by including functionalities with the virtual keyboard software to allow an individual user to adjust the target portions on a key-by-key basis, row-by-row basis, or on some other bases.

Figure 9:
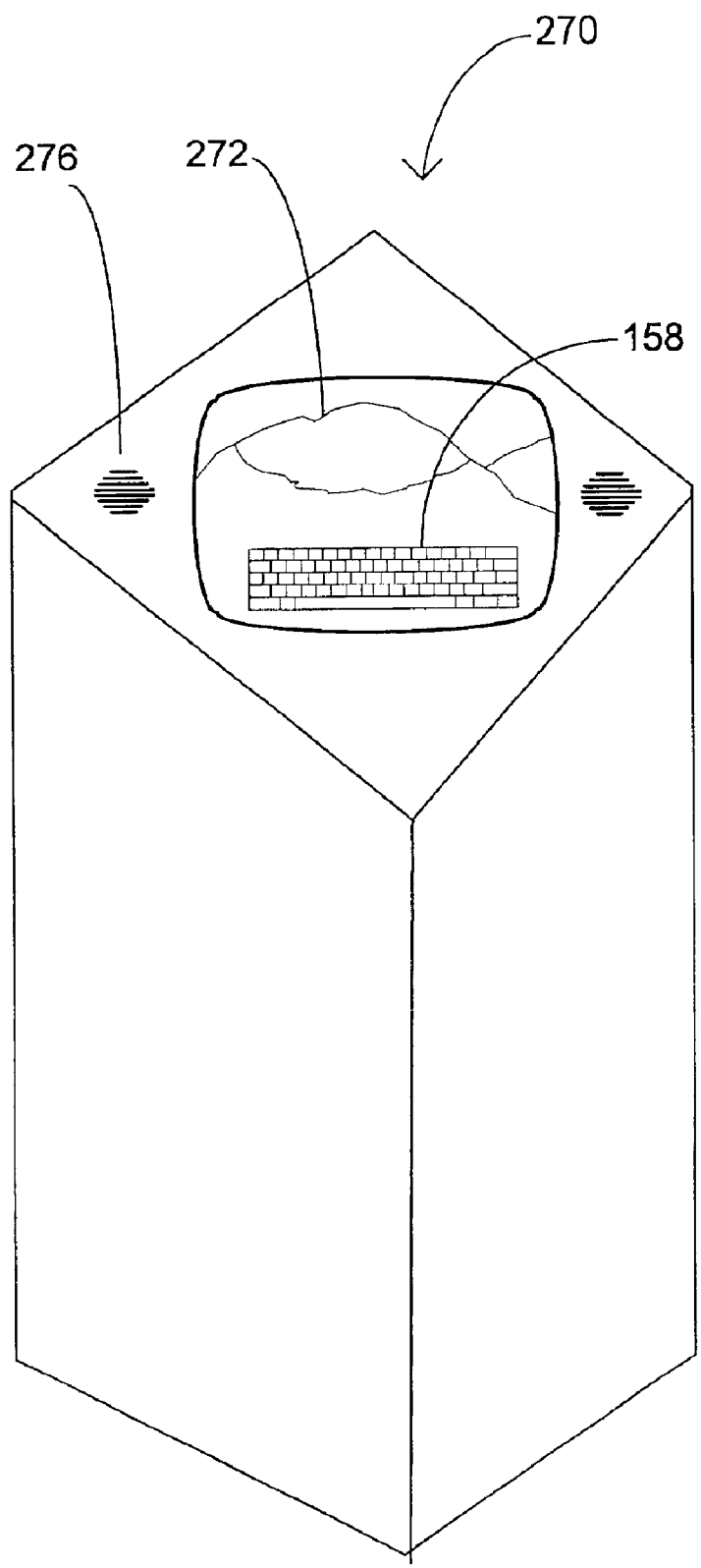
FIG. 9 is a schematic diagram showing a virtual keyboard implemented in a stand with a touch sensitive screen.

While the present invention has been described with reference to the embodiment of FIG. 1 where the virtual keyboard is presented by a portable monitor of a computer system, it will be appreciated that the virtual keyboard may be advantageously used in many other types of applications that use touch-sensitive screens. For example, in another embodiment illustrated in FIG. 8, a virtual keyboard is incorporated in a stand 270 that includes a readily accessible touch sensitive screen 272 on which a virtual keyboard image 158 is displayed for touch-typing. As shown in FIG. 9, the stand further includes speakers 276 for providing audio output. The touch sensitive screen 272 communicates, either wirelessly or through a wired connection, with a computer system that may be either contained within the stand or located remotely. The stand 270 utilizing the touch sensitive screen with the virtual keyboard can be located in a wide variety of locations for different purposes. For example, the stand may be located in a museum where visitors can communicate with the computer system through the virtual keyboard to retrieve information about exhibits. As another example, the stand may be located in a store or shopping mall where shoppers can retrieve information from the computer system such as location of items, availability, and pricing. As yet another example, the stand can function as an automatic teller machine dispensing currency to customers. The stand utilizing the touch sensitive display and keyboard could be employed in numerous other locations and the cited examples are exemplary only and not intended as a limitation upon other possible embodiments.

In view of the many possible embodiments to which the principles of this invention may be applied, it should be recognized that the embodiments described herein with respect to the drawing figures are meant to be illustrative only and should not be taken as limiting the scope of the invention. Therefore, the invention as described herein contemplates all such embodiments as may come within the scope of the following claims and equivalents thereof.

What is claimed is:

1. A computer-readable medium having computer-executable instructions that provide a virtual keyboard for a user interface, the instructions providing for:
   displaying a semi-transparent keyboard image on a touch sensitive screen over a background image;
   receiving a signal indicating a detected touch on the touch sensitive screen;
   determining whether the detected touch is on one of the key images of the keyboard image;
   if the detected touch is on a key image, generating a variable sound indicating that a keystroke is received, said variable sound selected according to a location of the detected touch within the touched key image; and
   altering a look of the touched key image to indicate that the keystroke is for the key corresponding to the touched key image.

2. A computer-readable medium as in claim 1, wherein the alphabet is the English alphabet, and the key images are in the "QWERTY" layout.

3. A computer-readable medium as in claim 1, wherein the keyboard image includes key images for number keys.

4. A computer-readable medium as in claim 3, wherein the keyboard image includes key images for function keys.

5. A computer-readable medium as in claim 1, wherein the key images are displayed with centerline-to-centerline distances in vertical and horizontal directions of the touch sensitive screen between 16 mm and 22 mm.

6. A computer-readable medium as in claim 5, wherein the key images are displayed with centerline-to-centerline distances of about 19 mm in the vertical and horizontal directions of the touch sensitive screen.

7. A computer-readable medium as in claim 1, wherein the step of altering darkens the touched key image.

8. A computer-readable medium as in claim 1, wherein generating a variable sound depends on a deviation between the location of the detected touch and a target portion of the touched key image.

9. A computer readable medium as in claim 8, wherein the target portion is around the geometric center of the touched key image.

10. A computer-readable medium having computer-executable instructions for a computing device to provide a virtual keyboard for user interface the instructions providing for:
    displaying a keyboard image on a touch sensitive screen, the keyboard image having a plurality of key images corresponding to individual keys;
    receiving a signal indicating a location of a detected touch on the touch sensitive screen;
    determining whether the detected touch is on one of the key images of the keyboard image;
    if the detected touch is on a key image, generating a variable sound to indicate that the touch is on the touched key image, the variable sound having an attribute selected according to a deviation of the location of the detected touch from a target portion of the touched key image to indicate where the detected touch is in relation to the target portion of the touched key image.

11. A computer readable medium as in claim 10, wherein the target portion of the touched key image is around the geometric center of the touched key image.

12. A computer-readable medium as in claim 10, wherein generating the variable sound includes determining a first offset in a horizontal direction and a second offset in a vertical direction of the touch sensitive screen between the location of the detected touch and the target portion of the touched key image, and setting first and second sound attributes of the generated sound according to the first and second offset, respectively.

13. A computer-readable medium as in claim 12, wherein the first and second sound attributes include a pitch and a tone of the generated variable sound.

14. A computer-readable medium as in claim 10, wherein generating the variable sound includes generating a first sound if the location of the detected touch is within a center zone of the touched key image and generates a second sound different from the first sound if the location of the detected touch is not within the center zone of the touched key image.

15. A computer-readable medium as in claim 10, wherein the key images correspond to individual keys including at least keys for a complete set of letters in an alphabet.

16. A computer-readable medium as in claim 15, wherein the key images in the keyboard image are arranged in a layout and size suitable for "ten-finger" touch-typing.

17. A computer-readable medium as in claim 16, wherein displaying the keyboard image includes displaying the keyboard image semi-transparently over a background image on the touch sensitive screen.

18. A computer-readable medium as in claim 17, wherein displaying the keyboard image includes displaying each key image with rounded corners and shaded edges.

19. A computer user interface device comprising:

a touch sensitive screen;

a processing unit for executing computer-executable instructions;

an audio output device;

a software control program having computer-executable instructions to be executed by the processing unit to display a semi-transparent keyboard image having a plurality of key images corresponding to individual keys on the touch sensitive screen over a background image, receive a signal indicating a detected touch on one of the key images of the keyboard image displayed on the touch sensitive screen, generate a variable sound using the audio output device to indicate that a keystroke is received, and alter a look of the touched key image to indicate that the keystroke is on the touched key image, said variable sound selected according to a location of the detected touch within the touched key image.

20. A computer user interface device as in claim 19, further including a wireless communication component for wireless network communications.

21. A computer user interface device comprising:

a touch sensitive screen;

a processing unit for executing computer-executable instructions;

an audio output device;

a software control program having computer-executable instructions to be executed by the processing unit to display a keyboard image having a plurality of key images corresponding to individual keys on the touch sensitive screen, receive a signal indicating a detected touch on one of the key images of the keyboard image on the touch sensitive screen, generate a variable sound to indicate that the touch is on the key image, the variable sound having an attribute selected according to a deviation of the location of the detected touch from a target portion of the touched key image to indicate whether the detected touch is on the target portion of the touched key image.

22. A computer user interface device as in claim 21, wherein the software control program has computer-executable instructions for displaying the keyboard image semi-transparently over a background image on the touch-sensitive screen.

23. A computer user interface device as in claim 22, wherein the key images displayed by the software control program correspond to individual keys for at least a complete set of letters in an alphabet arranged in a layout and size suitable for "ten-finger" touch-typing.

24. A computer user interface device as in claim 21, further including a wireless communication component for wireless network communications.

* * * * *